Sept. 5, 1939.　　　　J. F. KOEHLER　　　　2,171,704
ELECTRICAL APPARATUS
Filed Oct. 11, 1937
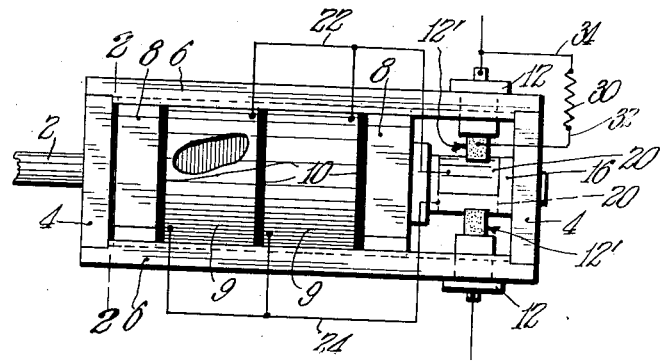
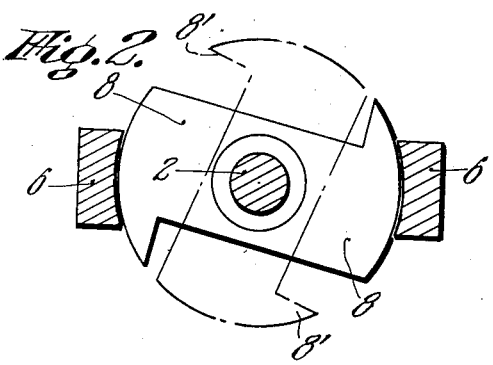
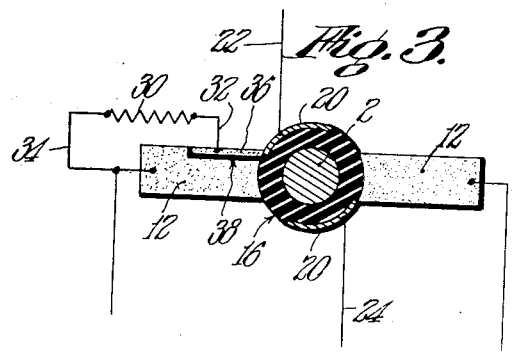
INVENTOR.
BY James F. Koehler
Walter C. Ross
ATTORNEY.

Patented Sept. 5, 1939

2,171,704

UNITED STATES PATENT OFFICE 2,171,704

ELECTRICAL APPARATUS

James F. Koehler, Northampton, Mass.

Application October 11, 1937, Serial No. 168,309

2 Claims. (Cl. 172—36)

This invention relates to improvements in electric motors and is directed to impulse motors adapted for use in connection with shaving devices, polishing apparatus and the like.

With impulse motors to which the invention relates there is no current-bearing conductor moving across a magnetic field, the field being set up intermittently by energizing one or more coils bringing about rotation of a soft iron pole or poles to rotate until the reluctance of a magnetic circuit is at a minimum when energy is cut off by means of a contact device so that the armature by its momentum and by the aid of a contact device facilitates another impulse.

The invention embodies the provision of magnetizing coils formed concentrically relative to a rotating shaft which tends to facilitate economy in manufacture by obviating the usual necessity of separately wound coils associated with the motor.

According to another feature of the invention the motor, by reason of its novel form, is compact so as to occupy small space adapting it to devices and apparatus which may be held by the hand of the user.

According to a further feature of the invention the novel construction of the motor is such that it functions with a fly-wheel effect which is desirable since the motor may generally operate at relatively low speeds and still possess the necessary angular momentum to overcome sudden increase in load. In prior art impulse motors this angular momentum has been obtained only by high rotational speeds.

According to a further feature of the invention it is preferred to employ plural coils in adjacent relation on the shaft which are connected in parallelism to the supply voltage thereby providing a relatively large magnetizing field as distinguished from that provided by a single coil of a length equal to that of the plural coils even though a single coil were employed which was made from wire twice or so the cross-sectional area of that of the plural coils. The current might in that case be the same but the number of turns about a unit length of armature core would be less. And in a coil of relatively smaller wire wound in a coil equal in length to the two coils the increased number of turns would be overcome by a decrease in current.

Another further feature of the invention is the provision of novel contact means. A common defect has been the excessive sparking that occurs at the instant of breaking the electrical circuit, due to the large induced electromotive force in the magnetizing coils as the magnetic field is suddenly caused to disappear. This defect cannot be removed as is done in series, shunt, or compound wound motors, by shifting the axis of commutation since no permanent field is present in an impulse motor. The defect is especially marked in motors designed for high rotational speeds. The common solution has been the use of contact materials, such as tungsten, which vaporizes with difficulty and does not supply ions to maintain the arc.

The solution here presented permits the use of far less expensive materials. It consists in the introduction of a suitable inexpensive impedance into the electrical circuit just prior to the actual instant of current break, with the result that the current falls away in two distinct steps. In the first step the time constant of the inductive circuit is made great enough so that no excessive electromotive force is induced, and in the beginning of the second step so little current remains flowing that no large electromotive force is occasioned by its final removal. With this arrangement, contact sparking is sufficiently reduced so that the usual copper and carbon materials may be used. In the present construction this impedance is a resistance. Obviously more than one resistance can be successively introduced, so that the current drops off in more than successive steps.

Various novel features and advantages of the invention will be hereinafter more clearly apparent from the accompanying description of the invention in the form at present preferred with particular reference to the accompanying drawing wherein:

Fig. 1 is a combination elevational and diagrammatic view showing a motor embodying the novel features of the invention;

Fig. 2 is a sectional elevational view on the line 2—2 of Fig. 1; and

Fig. 3 is a sectional elevational view to show the relationship of the brushes and contacts of the motor shown in Fig. 1.

Referring to the drawing more in detail the invention will now be described in detail.

A shaft or armature core is represented by 2 which is rotatable in end members 4. The said members 4 are fixed to and associated with longitudinally extending side members 6 which are preferably of soft iron. The end members and side members constitute a frame with the said end members being non-metallic or non-ferrous.

Pole members 8 are fixed to the shaft 2 so as to be rotatable by and with the said shaft and these are preferably of soft iron. Coils 9 of relatively fine wire are formed about shaft 2 and suitably fixed thereto while insulating washers 10 may be provided as shown.

The inner faces of members 6 are preferably concaved complemental to the peripheral curvature of the pole members 8 and coils 9 and are spaced therefrom to provide the desired clearance. Brush holders 12, as shown, are provided which have slidable therein brushes 12'.

A part 16 which may be called a commutator is fixed to shaft 2 and it preferably consists of an insulating member, as shown, carrying oppositely disposed electrically insulated contact members 20, the same being formed so that as the shaft rotates the brushes 12' ride on the insulating member so that the contact members 20 intermittently contact with the brushes 12'.

One end of each coil 9 is connected in some suitable manner as by 22 to one of the contact members 20. The opposite ends of the said coils are connected as by a connection 24 to the other contact member 20.

To eliminate sparking as will hereinafter appear means is provided which may consist of a resistance in the electrical circuit. To that end according to the form of the invention shown a resistance 30 is connected by connections 32 and 34 to the circuit and to a brush part 36 of one of the brushes which is insulated from the main body of the brush as indicated at 38.

In operation as the shaft 2 rotates the contacts 20 engage with the brushes 12' so that the coils 9 are energized bringing about magnetization of the pole members 8 which are attracted to the longitudinal side members 6. The coils and shaft being rotated, the energy is intermittently cut off from and supplied to the coils.

The contacts 20 are preferably so disposed with reference to leading extensions 8' of the pole members 8, that when the pole members are about in the position shown by dot-dash lines of Fig. 2 the coils are energized and the pole members magnetized so that the shaft is rotated. When the pole members approach the full line position approximately the contacts and brushes are out of engagement to cut the supply of energy.

The means for reducing or eliminating the sparking operates as follows:

Just as a contact passes from off the main body of the brush, the resistance is connected in the circuit through the brush part 36. In this way there is no instantaneous cessation of current and instead the current flow is interrupted by successive breaks of which there may be several according to the number of resistance units and parts of the brush or this may be accomplished in other ways.

One simple modification in the construction may be achieved by fixing the coils 9 to the side members 6, and allowing the shaft 2 with its pole pieces 8 to rotate freely within the coils. In this construction leads 22 and 24 are disconnected from the contacts 20, and the contacts are then connected to each other, one lead, such as 24, being connected directly to the supply voltage, the other, as 22, being connected to one brush, while the other brush is joined to the supply voltage. The insulated brush portion 32 and the impedance 30 is retained and functions as previously described. This construction utilizes the compact form that characterizes this invention, but by the reduction of the mass in rotation permits higher rotational speeds.

The side members 6 may be of laminated parts and the central shaft may be slotted if desired. The pole members may also be laminated if desired and various changes and modifications may be made without departing from the spirit and scope of the invention.

I claim:

1. An impulse motor comprising in combination, a rotatable member, magnetizing coils wound concentrically of and rotatable with said rotatable member, pole members on the rotatable member, relatively fixed members whereby a magnetic circuit may be completed through one or more of the fixed magnetic members, the current being introduced into a commutator by two brushes provided in association with the fixed members and two contacts associated with the commutator connected to opposite ends of the magnetizing coils, the other two commutator segments acting only to support the brushes, one of the brushes having attached rigidly to it and insulated from it a part with separate electrical lead which connects through a suitable resistance to the main lead from said brush, the additional brush and its resistance serving to cause the current to decrease more slowly on the break of the circuit.

2. An impulse motor comprising in combination, a frame including end members insulated from spaced longitudinal bar-like side members, an armature core shaft journalled in said end members for rotation, an armature coil means for said armature shaft having its windings entirely on said core and between the longitudinal side members of the frame and concentrically disposed on said core, and rotatable therewith, contact members on and rotatable with said core, and brushes carried by said support contacting with said members.

JAMES F. KOEHLER.